United States Patent
Kao

(10) Patent No.: US 7,080,005 B1
(45) Date of Patent: Jul. 18, 2006

(54) COMPACT TEXT-TO-PHONE PRONUNCIATION DICTIONARY

(75) Inventor: Yu-Hung Kao, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 904 days.

(21) Appl. No.: 09/590,613

(22) Filed: Jun. 8, 2000

Related U.S. Application Data

(60) Provisional application No. 60/144,216, filed on Jul. 19, 1999.

(51) Int. Cl.
*G06F 17/21* (2006.01)
*G10L 15/04* (2006.01)

(52) U.S. Cl. .......................................... 704/10; 704/254
(58) Field of Classification Search .................... 704/7, 704/10, 243, 244, 254, 9
See application file for complete search history.

(56) References Cited

U.S. PATENT DOCUMENTS

| | | | | |
|---|---|---|---|---|
| 4,342,085 A | * | 7/1982 | Glickman et al. | 707/532 |
| 5,835,888 A | * | 11/1998 | Kanevsky et al. | 704/10 |
| 6,148,283 A | * | 11/2000 | Das | 704/222 |
| 6,230,131 B1 | * | 5/2001 | Kuhn et al. | 704/266 |
| 6,243,680 B1 | * | 6/2001 | Gupta et al. | 704/258 |
| 6,308,149 B1 | * | 10/2001 | Gaussier et al. | 704/9 |
| 6,363,342 B1 | * | 3/2002 | Shaw et al. | 704/220 |
| 6,738,741 B1 | * | 5/2004 | Emam et al. | 704/251 |

* cited by examiner

*Primary Examiner*—Angela Armstrong
(74) *Attorney, Agent, or Firm*—W. James Brady, III; Frederick J. Telecky, Jr.

(57) ABSTRACT

A typical English pronunciation dictionary takes up to 1,826,302 bytes in ASCII to store. A five times compression while maintaining computability is achieved by prefix delta encoding of the word and error encoding of the pronunciation.

18 Claims, 1 Drawing Sheet

COMPACT TEXT-TO-PHONE PRONUNCIATION DICTIONARY

This application claims priority under 35 USC § 119(e)(1) of provisional application number 60/144,216, filed Jul. 19, 1999.

FIELD OF INVENTION

This invention relates to a method to convert text into its correct phone sequence and form a compact phone dictionary that may be embedded in a compact computer chip.

BACKGROUND OF INVENTION

In a large vocabulary speech recognition system, a text-to-phone component is required to convert the text into its correct phone sequence. The system then selects corresponding phonetic models to construct recognition models based on the phone sequence. The size and complexity of the text-to-phone component vary widely for different languages. For a language with more regular pronunciations than English, such as Spanish, a few hundred rules are enough to convert text to phone accurately. On the other hand, for a language with more irregular pronunciation, such as English, tens of thousands of rules are required to convert text to phone accurately. There are about as many pronunciation rules as there are words in English. It is really a pronunciation dictionary. We use a typical English pronunciation dictionary with 70,955 entries. It takes up to 1,826,302 bytes in ASCII form.

It is highly challenging to implement the text-to-phone dictionary in an embedded system such as part of a computer chip where memory space is a premium. One such use, for example, is building speech recognition models for a phrase used in a voice controlled web browser. One has to start with the text and look up a pronunciation dictionary of phones for the text. Once the phones are identified and the sequence of phones for words are determined, HMM model for each phone is determined. A dictionary with 1.8 Mbytes is too large a storage requirement for an embedded system. While compression techniques such as the asymptotically optimal Lempel-ZIV coding can be used for compression, this form of compression is not computable or searchable. The compressed data must be uncompressed to do a dictionary lookup. One, therefore, must have the memory space to do the lookup and therefore the uncompression defeats the purpose of saving memory space.

In addition, dictionary lookup usually requires additional data structures other than the dictionary itself. For example, once a dictionary is loaded into the memory which requires, for the example, 1.8 Mbytes, a very large array of address pointers is required to search the memory.

SUMMARY OF INVENTION

In accordance with one embodiment of the present invention, a resource efficient representation of a pronunciation dictionary is provided by efficiently formatting the pronunciation dictionary by reducing vocabulary.

In accordance with another embodiment of the present invention, the dictionary only contains entries with pronunciation rules different from the rule set prediction.

DESCRIPTION OF PREFERRED EMBODIMENT OF THE PRESENT INVENTION

Figure 1:
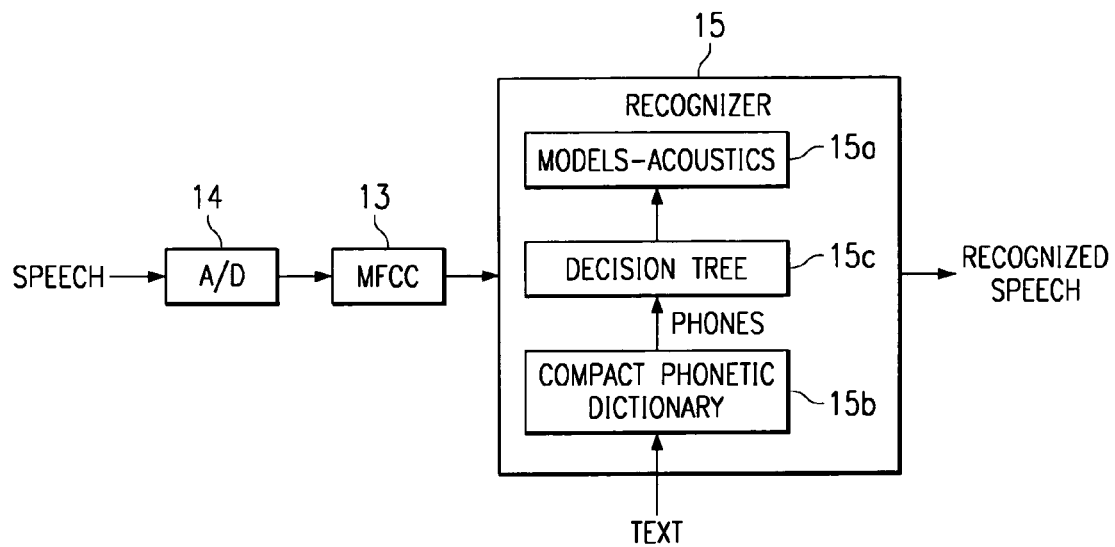
FIG. 1 is a block diagram of a recognition system according to one embodiment of the present invention with an embedded dictionary.

Referring to FIG. 1, there is illustrated a block diagram of a speech recognition system including an analog to digital (A/D) converter 11 for providing digital samples of the speech. The output of the A/D converter is provided to a Mel Frequency Cepstral Coefficient (MFCC) processor 13. The output of the processor is provided to a recognizer 15. The recognizer also includes acoustic models of words to be recognized in the recognizer. The recognizer includes a processor with embedded memory for storing the acoustic model 15a. The acoustic models are made from phones from a pronunciation dictionary 15b using context dependent decision tree 15c. See, for example, Applicant's application entitled "Low Resource Decision Tree," application serial number (Texas Instruments, Inc. No. TI-29100), filed even date herewith. This application is incorporated herein by reference. A text-to-phone component is required to convert text into its correct phone sequence using the decision tree 15c. The present invention is to compress the size of the pronunciation dictionary 15b while maintaining the computability or searchability. Uncompressing a compression scheme such as in the Lempel-ZIV coding defeats the purpose of keeping the dictionary small at all times.

The format of a dictionary follows the example format below:

| ABLE | ey b ax l |
| ABLEST | ey b l. ih s t |
| ABLE_BODIED | ey b ax l b aa d iy d |
| ABLY | ey b l iy |
| ABNER | ae b n er |
| ABNORMAL | ae b n ow r m ax l |
| ABNORMALITIES | ae b n ow r m ae l ih t iy z |
| ABNORMALITY | ae b n er m ae l ih t iy |
| ABNORMALLY | ae b n ow r m ax l iy |
| ABOARD | ax b ow r d |
| ... | |
| BARGAIN | b aa r g ax n |
| BARGAINED | b aa r g ax n d |
| BARGAINER | b aa r g ax n er |
| BARGAINERS | b aa r g ax n er z |
| BARGAINING | b aa r g ax n ih ng |
| BARGAINS | b aa r g ax n z |
| BARGE | b aa r jh |
| BARGED | b aa r jh d |
| BARGELLO | b aa r jh eh l ow |
| BARGER | b aa r jh er |
| BARGES | b aa r jh ih z |
| ... | |

Every entry takes up one line: the word followed by tab, followed by phone sequence.

In accordance with one embodiment of the present invention, delta coding is used between neighbors since word and phone sequences look a lot alike between neighbors. This is step 101 in FIG. 2. A typical English language phone set is 46 phones. There can be up to three letters in text in each phone. One byte is used to code each phone. Because the dictionary is sorted by the text of the word, maximum prefix overlap between words occurs with immediately neighboring entries. In accordance with the prefix delta encoding of the word herein, the number of overlapping characters with previous entry is coded using a negative number byte. For example, the entry "abandoned" is followed by "abandoning," then "abandoning" is encoded as "−7ing." This means using the first seven of the nearest neighbor and adding on "ing." Ten bytes is reduced to four bytes. The seven letters are represented by "7." The negative is used to distinguish from ASCII (ASCII≦127, thus always positive). The prefix delta coding is used when the overlapping is more than one character.

This algorithm is very effective due to the fact that the dictionary is sorted in alphabetical order. For an English dictionary list of 70,955, it is almost as good as the asymptotically optimal Lempel-ZIV coding wherein the original ASCII file is 616K, the Lempel-ZIV is 284K, the prefix delta encoding is 311K. The prefix delta encoding is computable or searchable.

In accordance with a preferred embodiment of the present invention, a public domain rule set from the Naval Research Laboratory is used. The rule set is from NRL Report 7948, dated Jan. 21, 1976, published by the National Technical Information Service as document "AD/AO21929." A copy is provided in Appendix A. It has 384 rules. Each rule consists of the text to be converted to phone, left/right contexts, and the output phone sequence.

An example of one of the rules is:

{Anything, "AW", Anything, "AO"}

It means that the text "AW" will be converted to phone "AO" (as in 1AWn). The left and right contexts can be anything (do not care).

Because it is a small rule set, the accuracy of the phone sequence it predicts is not good. When all 70,955 entries in the example dictionary are run through these rules and calibrate the performance, the word error rate (WER) is 19.7%. The WER means the percentage of phones of the prediction that do not match the correct pronunciation. The sentence error rate (SER) is 69.5%. The SER means the percentage of words where the pronunciation does not completely match the prediction. In other words, the rule predicts only about 30% of the word entries correctly. Most of the errors are substitution errors. The substitution error rate is 16%. The insertion error rate is the error of wrongly inserting a phone and this error rate is 2.6%. The deletion error is a missing phone and that error rate is 1.1%. The WER error rate of 19.7% means that about 80% of the phones are predicted correctly.

Because 80% of the phones can be predicted correctly, the dictionary can be error encoded to save space. This is Step 102 in FIG. 2. For example, the correct pronunciation for the word "about" is "ax b aw t." The pronunciation from the rule prediction is "ae b aw t." According to the teaching herein, there is no need to store four bytes to store all four phones of the pronunciation. Only the prediction error is stored which is the prediction error at point 1, phone "ax." The substitution error requires one byte for position and a second byte for the phone. Insertion error requires one byte to encode only the positions since that position is simply taken out. For deletion error, there is a need for two bytes: one for position and the second for the added phone. Since 16% is substitution error, 1.1% is the deletion error and 2.6% is the insertion error, (16.0+1.1)×2+2.6=36.8% compression is achieved using error coding. Of the 70,955 entries, 49,344 or about 70% of the entries are different from the prediction. The error rate of prediction on these 49,344 entries is:

| #SNT   | Corr. | Sub. | Del. | Ins. | WER  | SER |
|--------|-------|------|------|------|------|-----|
| 49,344 | 77.0  | 21.5 | 1.5  | 3.5  | 26.5 | 100 |

The SER is 100% because only the difference from prediction entries is used. There are a total of 348K phones in the pronunciation of these 49,344 entries. Using the same formula, substitution and deletion require 2 bytes and insertion requires one byte, Substitution (21.5)+Deletion (1.5)= 23×2=46+Insertion (3.5)=49.5%. Error encoding of these phones will require 348K×49.5%=172K.

There is redundancy of the error encoded pronunciation. Therefore, prefix delta encoding is applied after the error encoding to the pronunciation. This is Step 103 in FIG. 2. First, we apply the rule to the word and then we error encode the word and then we perform prefix coding. For example, the word "aboutface" we encode the pronunciation error in "about" with correction in position 1 from "ae" to phone "ax" then the prefix encoding of aboutface becomes "2," one byte only.

Using the above, there are 50,624 entries needed to code. More than 49,344 to account for multiple pronunciations All entries of the same word are needed when some alternate pronunciations are different.

The size in bytes of 411,723 for the original ASCII is reduced to 187,734 for prefix delta encoding.

For the pronunciation, also 50,624 entries the size in bytes for original ASCII is 356,386, for the prefix delta is 218,479, for the error encoding is 172,579 and for both error encoding plus prefix delta is 129,241.

Figure 2:
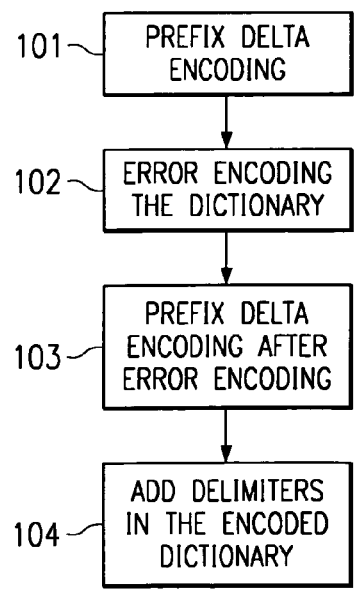
FIG. 2 illustrates steps for making a compact text-to-phone dictionary.

In addition to the above data, delimiter characters are needed to separate each entry and to separate word and pronunciations in each entry. Therefore, the final encoded entry comprises:

(a) Prefix encoded word as indicated in Step 101 of FIG. 2. The first byte may be negative since it represents the number of bytes (≧2) of overlapping prefix with previous entry. Otherwise, all bytes are positive because all ASCII codes are positive (<127).

(b) The length of pronunciation in bytes, bitwise ORed with character 0×80 to signal the end of the word because all word bytes are positive. Because it is the length of the pronunciation, so we know where the pronunciation ends. This is the only one byte of delimiter character we need to store for each entry. This is explained later.

(c) Error and prefix delta encoded pronunciation. Substitution and deletion errors require two bytes to code (position and phone), insertion error requires one byte to code (position). Position (6 bits) is encoded with two most significant bits (MSB) to distinguish whether it is substitution or deletion or insertion or match. Match is the prefix delta coding to be coded with 6 bits prefix overlapping count with previous neighbor entry.

Therefore, the final size of the encoded dictionary is 187,734+50,624+129,241=367,599.

We can load the above files of 367,599 bytes and create an array of 50,624 addresses to access each entry. The prefix delta encoding and error encoding can be decoded easily.

However, 50,624 addresses requires 50,624×4 (address or index requires 4 bytes)=202,496 bytes. This is too large and almost as large as the dictionary. The alternative is to embed some alignment characters (the delimiter discussed above) in the encoded dictionary so that no matter which byte we fall in the dictionary byte stream, we can always find the start of an entry. See Step 104 in FIG. 2. This alignment character has to be unique. Applicant chose, for example, 0xff and make sure in the encoding algorithm that no other bytes can be 0xff. This is done by imposing some range limitations, which is very loose, almost impossible to break. We can embed 50,624 alignment bytes, one for each entry, but there is no need for this. It has been determined that one byte in 10 entries is sufficient. We know the start of every ten words. In binary search, for example, we can search the ten words to see if the entry is in them.

I claim:

1. A processor for creating a reduced size encoded pronunciation dictionary from an input pronunciation dictionary such that the encoded pronunciation dictionary does not need to be expanded to a larger size in order to be utilized, comprising:
   a reading and sorting processor to read an input pronunciation dictionary and sort the words of the dictionary in alphabetical order;
   a word encoder that encodes each word of the pronunciation dictionary by comparing the word with the prior word encoded and either outputs the number of prefix characters that match both the word and the prior word beginning characters if the number of matching characters is greater than or equal to N followed by the suffix characters of the word after character N, or outputs all characters of the word if the number of prefix characters that match the word and prior encoded word is less than N;
   a text-to-pronunciation processor that operates on the word to be encoded to generate a pronunciation hypothesis;
   a pronunciation comparer that compares the pronunciation of each word by comparing the pronunciation of the word from the input pronunciation dictionary and the pronunciation hypothesis from the text-to-pronunciation processor and determines the minimum number of pronunciation differences consisting of substitutions, deletions and insertions that need to be corrected in the pronunciation hypothesis to convert it to match the pronunciation of the input pronunciation dictionary; and
   a pronunciation encoder that compares the pronunciation differences of the word to the pronunciation differences of the prior encoded word and either outputs the number of prefix differences that match the beginning of both the word differences and the prior word differences followed by the suffix differences of the word if the number of prefix matching differences is greater than or equal to M, or outputs all differences to the word if the number of prefix differences that match the word and prior encoded word is less than N.

2. The processor of claim 1 where N=2.

3. The processor of claim 1 where M=1.

4. The processor of claim 1 where the input pronunciation dictionary and the text-to-pronunciation processor provide the pronunciation of a word in terms of phones of a language.

5. The processor of claim 1 where the output characters of the word encoder are in bytes.

6. The processor of claim 1 where the pronunciation encoder outputs the number of prefix differences that match as a byte character.

7. The processor of claim 1 where the pronunciation encoder outputs a substitution difference as two byte characters which indicate the difference is a substitution, the location of the difference, and the pronunciation difference to substitute.

8. The processor of claim 1 where the pronunciation encoder outputs a deletion difference as two byte characters which indicate the difference is a deletion, the location of the difference, and the pronunciation difference that was deleted.

9. The processor of claim 1 where the pronunciation encoder outputs an insertion difference as one byte character which indicates the difference is an insertion and the location of the difference.

10. A method for creating a reduced size encoded pronunciation dictionary from an input pronunciation dictionary such that the encoded pronunciation dictionary does not need to be expanded to a larger size in order to be utilized, comprising the steps of:
    reading an input pronunciation dictionary and sorting the words of the dictionary in alphabetical order using a processor;
    encoding each word of the pronunciation dictionary by comparing the word with the prior word encoded and either outputting the number of prefix characters that match both the word and the prior word beginning characters if the number of matching characters is greater than or equal to N followed by the suffix characters of the word after character N, or outputting all characters of the word if the number of prefix characters that match the word and prior encoded word is less than N;
    operating on the word to be encoded by a text-to-pronunciation processor to generate a pronunciation hypothesis;
    comparing the pronunciation of each word using a pronunciation comparer by comparing the pronunciation of the word from the input pronunciation dictionary and the pronunciation hypothesis from the text-to-pronunciation processor and determining the minimum number of pronunciation differences consisting of substitutions, deletions and insertions that need to be corrected in the pronunciation hypothesis to convert it to match the pronunciation of the input pronunciation dictionary; and
    comparing the pronunciation differences of the word to the pronunciation differences of the prior encoded word by a pronunciation encoder and either outputting the number of prefix differences that match the beginning of both the word differences and the prior word differences followed by the suffix differences of the word if the number of prefix matching differences is greater than or equal to M, or outputting all differences to the word if the number of prefix differences that match the word and prior encoded word is less than N.

11. The method of claim 10 where N=2.

12. The method of claim 10 where M=1.

13. The method of claim 10 where the input pronunciation dictionary and the text-to-pronunciation processor provide the pronunciation of a word in terms of phones of a language.

14. The method of claim 10 where the output characters of the word encoder are in bytes.

15. The method of claim 10 where the pronunciation encoder outputs the number of prefix differences that match as a byte character.

16. The method of claim 10 where the pronunciation encoder outputs a substitution difference as two byte characters which indicate the difference is a substitution, the location of the difference, and the pronunciation difference to substitute.

17. The method of claim 10 where the pronunciation encoder outputs a deletion difference as two byte characters which indicate the difference is a deletion, the location of the difference, and the pronunciation difference that was deleted.

18. The method of claim 10 where the pronunciation encoder outputs an insertion difference as one byte character which indicates the difference is an insertion and the location of the difference.

* * * * *